July 19, 1938.  W. S. WOLFRAM  2,124,097
AUTOMOBILE CLUTCH
Filed Sept. 13, 1937  2 Sheets—Sheet 1

Inventor
William S. Wolfram
By Blackmore, Spencer & Flint
Attorneys

July 19, 1938.  W. S. WOLFRAM  2,124,097
AUTOMOBILE CLUTCH
Filed Sept. 13, 1937  2 Sheets-Sheet 2

Inventor
William S. Wolfram
By
Blackmore, Spencer & Flint
Attorneys

Patented July 19, 1938

2,124,097

UNITED STATES PATENT OFFICE 2,124,097

AUTOMOBILE CLUTCH

William S. Wolfram, Dayton, Ohio, assignor to General Motors Corporation, Detroit, Mich., a corporation of Delaware Application September 13, 1937, Serial No. 163,557

7 Claims. (Cl. 192—32)

This invention relates to clutches and has been designed as an improved clutch for connecting the engine shaft to the transmission shaft of a motor vehicle.

One object of the invention is the introduction of servo mechanism to supplement the clutch engaging spring whereby a lighter spring may be used resulting in a reduced pedal pressure to effect clutch release.

Another and related object is the use of the torque of the clutch unit to actuate the servo mechanism.

As another object the invention contemplates the accomplishment of the major objects by novel structural arrangements which shall be efficient, simple and comparatively inexpensive.

Other objects and advantages will be understood from the following description.

The accompanying drawings illustrate one embodiment of the invention.

Figure 1:
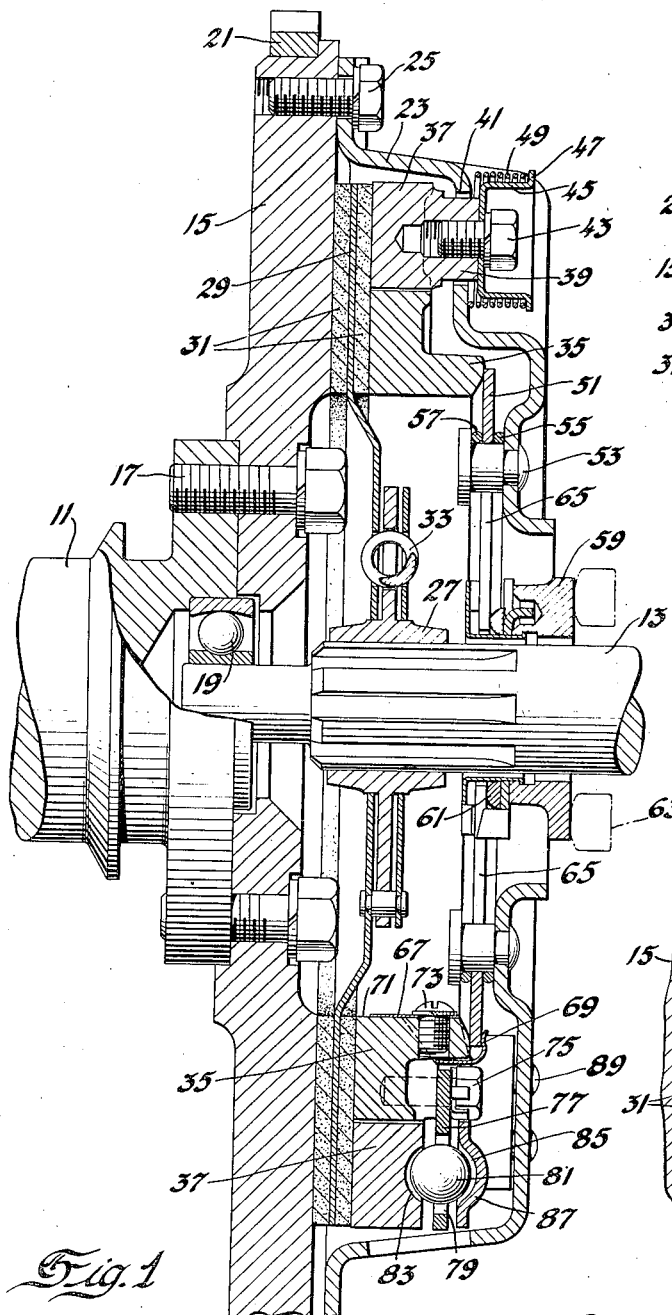
Figure 1 is a transverse section through the novel clutch.

Referring to the drawings, the engine shaft is marked 11, the transmission shaft 13, the flywheel 15 and a fastening device marked 17 is used to secure the flywheel to the engine shaft. The drawings show a pilot bearing 19 for the end of the transmission shaft and a starter gear 21 carried by the flywheel.

A cover or abutment plate 23 is secured to the flywheel by bolts 25. At the end of the driven shaft 13 within the housing formed by the flywheel and its cover is a hub 27. A driven plate 29 having facings 31 is carried by the hub 27, there being used between the hub and plate 29 cushioning springs 33 in a way well-known in the art.

The pressure plate is divided into two parts, an inner ring 35 and a concentric outer ring 37. The outer ring has a plurality of lugs 39 extending axially through openings 41 in the cover. By this means the rotation of the flywheel and its cover transmits rotary movement to the outer ring 37. A bolt 43 is threaded into each lug 39. It clamps beneath its head a cup 45. The cup is formed with a radial flange 47 between which and the cover 23 is a coil spring 49. It will be understood that the several springs 49 function to withdraw the outer ring 37 from contact with the driven plate 29.

The inner pressure plate ring 35 is biased to clutch engaging position by a Belleville spring 51. The cover 23 is provided with shouldered fulcrum pins or rivets 53 distributed in a circular series. These pins support fulcrum rings 55 and 57 and holes in the Belleville spring make possible its assembly upon the pins 53 between the fulcrum rings. Radially outward from the fulcrum pins the spring plate engages the pressure plate ring 35 along a substantially circular region of contact. The inner margin of the spring plate 51 is secured to a collar 59 by retaining mechanism. This retaining mechanism is no part of this invention and is designated as a whole by numeral 61. Numeral 63 is used to designate the forked ends of a more or less conventional throwout lever.

When the clutch pedal is released the circular periphery of the spring plate 51 pushes the pressure plate ring 35 into engagement with the driven plate 29, the reaction being against the fulcrum ring 55. When the throwout lever moves collar 59 to the left as seen in Figure 1, the spring plate fulcrums on ring 57 and its pressure on the pressure plate 35 is relieved. To render this releasing action easier than would otherwise be the case, the plate 51 is formed with radial slots 65 extending from the region of the fulcrum pins to the collar. To withdraw the pressure plate ring 35 from contact with the driven plate there is used a stamping 67 having an end 69 in contact with the marginal edge of spring plate 51. This stamping is shaped so as to engage the face 71 of ring 35 to which it is secured by suitable means 73. As the outer marginal edge of the spring 51 moves in the act of clutch release the stamping 67 reciprocates the pressure plate ring 35 away from the driven plate.

Figure 4:
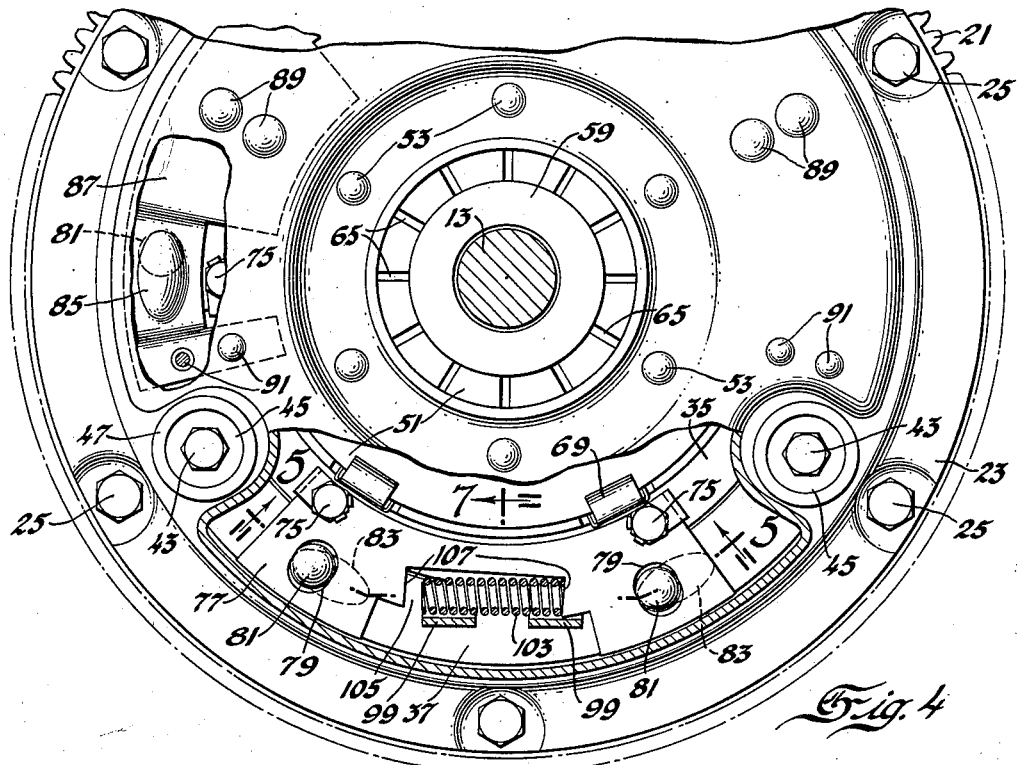
Figure 4 is a view in elevation partly broken away.
Figure 5:
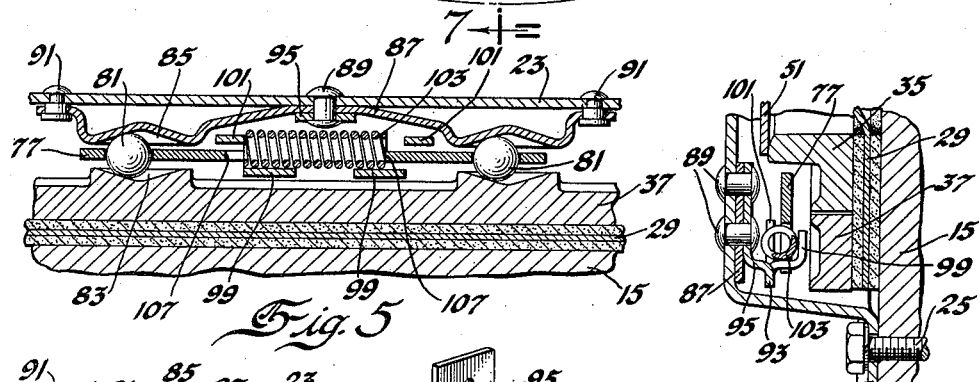
Figure 5 is a developed section on line 5—5 of Figure 4.
Figure 7:
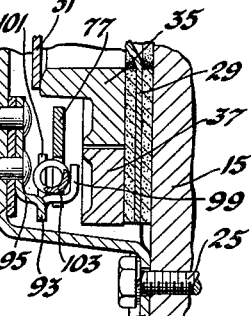
Figure 7 is a section on line 7—7 of Figure 4.

The inner pressure plate ring 35 has secured thereto by fastening means 75 a plurality of segmental plates 77 shaped as shown in Figure 4. Near the ends of each segmental plate are radially extended slots 79 and within each slot is a ball 81 having a diameter substantially corresponding to the shorter and circumferential axis of the slot. The ball is located between a circumferentially elongated groove or pocket 83 formed in the cast-iron pressure plate ring 37 and a similar groove or recess 85 formed in a resilient plate 87 shaped as best shown in Figures 4 and 5. This plate is carried by the cover 23. Radially spaced rivets 89 secure the plate 87 adjacent the center of its arc to the cover, there being one such plate 87 corresponding to each segment 77. It will be seen that the recesses 85 are located one near each end. It will also be observed from Figure 4 that the plate 87 in the vicinity of each recess 85 is partly cut away to accommodate bolt 75. Shouldered rivets 91 position the extremities of plate 87 relative to the cover in a way to permit some freedom of axial movement as shown in Figure 5, this movement resulting from the resiliency of the plate.

Figures 6, 8:
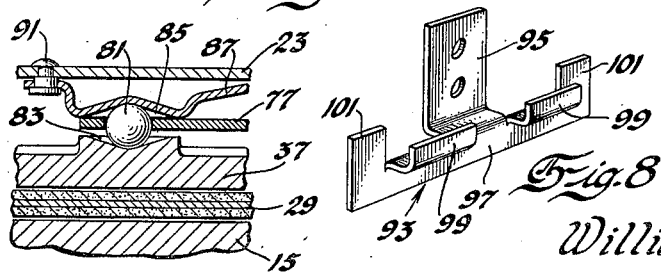
Figure 6 is another sectional view corresponding to a portion of Figure 5 with certain parts in other relative positions.
Figure 8 shows a detail in perspective.

An angular plate 93, best shown in Figure 8, has a tongue 95 between its ends which tongue is secured by the above referred to fastening means 89 to the cover. The plate 93 has an elongated portion 97 substantially parallel with but spaced from tongue 95. Part 97 is formed with arms 99 bent from the plane of said part. Beyond the arms 99 are terminal arms 101 in the plane of said part 97. A coil spring 103 is supported by the two arms 99 and is positioned between the terminal arms 101. The segmental plate 77 is also cut away as shown at 105 in Figure 4 to receive the spring 103 between edges or faces 107.

Figure 2:
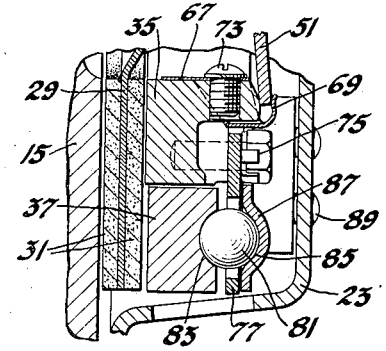
Figures 2 and 3 are sectional views corresponding to the lower part of Figure 1 but showing parts displaced from the positions they occupy in Figure 1.
Figure 3:
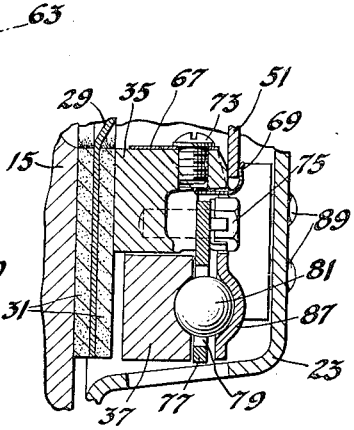

In the clutch released position both pressure plate rings 35 and 37 are out of contact with the driven plate as shown in Figure 2. The outer part 37 is so disposed circumferentially that both edges 107 of plate 77 and both ends 101 of plate 93 engage the spring 103. The balls 81 are in the deep parts of the grooves of the recesses 83 and 85 as shown in Figure 6. In applying the clutch the spring 51 is allowed to move the inner pressure plate ring 35 into contact with the driven plate 29, while the outer ring 37 remains momentarily in its clutch released position. This intermediate step in the process of clutch engagement is shown by Figure 3. Prior to clutch engagement it may be that the engine shaft carrying with it the outer ring 37 is rotating more rapidly than the driven shaft 13 carrying the driven plate 29. The contact of ring 35 with the driven plate therefore causes ring 35 to lag behind ring 37. This lag or relative circumferential movement between the rings 35 and 37 causes the segmental plate 77 to carry the balls 81 circumferentially from the deep parts of grooves 83 and 85 to the shallow parts. Figure 5 is intended to illustrate this changed position of the balls in the grooves. This step in clutch engagement causes the compression of spring 103 between one end 101 of plate 93 and an opposite face 107 of plate 77. The long axes of slots 83 and 85 extend circumferentially and are such that no high stresses occur between the balls and their seats. It is therefore possible to form the slots 83 within the surface of the cast-iron pressure plate ring itself, and it is not necessary to resort to special steel inserts. Also the member 87 which is formed with the other ball seats is resilient and is permitted to yield to and from the cover owing to the freedom of motion at the positioning rivets 91. This yielding pressure transmitted to the balls insures approximately uniform pressure on the several balls. It will be understood that the rolling of the balls into the shallow parts of the recesses forces the outer pressure plate ring 37 away from the cover 23 and into contact with the driven plate so that both rings 35 and 37 cooperate in gripping the driven plate. Figure 1 is intended to show this position where both rings are functioning together.

When the clutch is to be released, lever 63 moves collar 59 to the left in Figure 1. The collar now takes the thrust of the spring from ring 55. The spring fulcrums about ring 57 and its pressure on the pressure plate ring 35 is withdrawn. As the outer end of spring plate 51 moves away from ring 35 the stamping 67 serves to positively remove the ring 35 from contact with the driven plate. At this point the spring 103 restores ring 37 by circumferential movement to its initial position relative to plate 35, the balls rolling into the deep parts of the recesses. The spring 49 between the cover and the cup flange 47 removes the pressure plate ring 37 from contact with the driven plate.

I claim:

1. In a clutch, driving and driven members, said driving member including as a part thereof an abutment plate, a pressure plate comprising first and second concentric rings, said rings mounted for relative axial and circumferential movement, yielding means to move said first ring into contact with said driven member, means having a radial slot carried by said first ring, a ball in said slot, a circumferentially elongated groove in said second ring and means carried by said abutment plate having a cooperating circumferential groove whereby relative rotary movement between said rings moves said second ring into contact with said driven plate.

2. The invention defined by claim 1, said grooved abutment plate carried means being resilient.

3. In a clutch, driving and driven members, said driving member including an abutment plate, a pressure plate comprising first and second concentric rings, said rings mounted for limited relative axial and circumferential movement, means to transmit the rotary movement of the driving member to the second ring, yielding means to move the first concentric ring into contact with said driven member, mechanism carried by said first concentric ring and overlying said second concentric ring, said mechanism having radial slots therein, balls in said slots, circumferentially extended grooves in said second ring seating said balls and resilient plates secured to said abutment plate, said resilient plates having cooperating circumferential grooves also seating said balls.

4. The invention defined by claim 3, said resilient plates being of arcuate form attached to said abutment plate near the center of their arcs and spaced from the abutment plate near their ends, the resilient plate grooves being adjacent said ends.

5. The invention defined by claim 3, together with a stamping secured to said abutment plate, said stamping and said mechanism having parts with spaced arms and a spring located between said arms, said spring adapted to be stressed in response to relative circumferential movement between said first and second pressure plate rings.

6. The invention defined by claim 3, together with a stamping secured to said abutment plate, said stamping and said mechanism having parts with spaced arms and a spring located between said arms, said spring adapted to be stressed in response to relative circumferential movement between said first and second pressure plate rings and yielding means to bias said second ring to a position free from contact with said driven member.

7. In a clutch, a flywheel, a cover secured thereto, a pressure plate within said cover, said pressure plate constituted by inner and outer coaxial rings, means to yieldingly press the inner ring toward the flywheel, yielding means to withdraw the outer ring away from the flywheel, a driven member adapted to be gripped between the flywheel and pressure plate, and mechanism responsive to the engaging action of the inner ring to cause the outer ring to move to clutch engaging position, said mechanism comprising a segmental plate secured to the inner ring, said segmental plate having a radial slot, a ball in said slot, said outer ring having a circumferentially extended groove and a resilient plate secured to said cover, said resilient plate having a second circumferentially extended groove, said circumferentially extended grooves seating said ball.

WILLIAM S. WOLFRAM.